(12) United States Patent
Lee

(10) Patent No.: US 9,250,693 B2
(45) Date of Patent: Feb. 2, 2016

(54) APPARATUS AND METHOD FOR CONTROLLING POWER OF EXTERNAL MEMORY IN MOBILE TERMINAL

(71) Applicant: Samsung Electronics Co., Ltd., Gyeonggi-do (KR)

(72) Inventor: Won-Wook Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 305 days.

(21) Appl. No.: 13/859,009

(22) Filed: Apr. 9, 2013

(65) Prior Publication Data

US 2013/0283080 A1    Oct. 24, 2013

(30) Foreign Application Priority Data

Apr. 19, 2012    (KR) .......................... 10-2012-0041000

(51) Int. Cl.
*G06F 1/32* (2006.01)
*G06F 1/26* (2006.01)
*G06F 1/28* (2006.01)

(52) U.S. Cl.
CPC .............. *G06F 1/3287* (2013.01); *G06F 1/266* (2013.01); *G06F 1/28* (2013.01)

(58) Field of Classification Search
CPC .......... G06F 1/3287; G06F 1/266; G06F 1/28
See application file for complete search history.

(56) References Cited

U.S. PATENT DOCUMENTS

| 5,300,765 | A  | * | 4/1994  | Mizuta ........................ | 235/492 |
| 6,557,106 | B1 | * | 4/2003  | Yuzawa et al. ................ | 713/300 |
| 7,155,620 | B2 | * | 12/2006 | Cohen et al. .................. | 713/320 |
| 7,948,356 | B2 | * | 5/2011  | Kawamura et al. ............. | 340/3.1 |
| 8,624,434 | B2 | * | 1/2014  | Lee et al. ....................... | 307/66  |
| 2010/0131707 | A1 | * | 5/2010 | Chi et al. ...................... | 711/115 |

* cited by examiner

*Primary Examiner* — Stefan Stoynov
(74) *Attorney, Agent, or Firm* — Cha & Reiter, LLC

(57) ABSTRACT

An external memory power control apparatus and method capable of controlling power of an external memory inserted into a mobile terminal. The external memory power control apparatus includes an external memory power switch for switching between a power supply and an external memory to supply or block power for the external memory; and a controller, when 'power-on' is selected on the mobile terminal, for checking and notifying operability of the external memory inserted into the mobile terminal after completing booting while the external memory power switch turned off, wherein the controller may selectively turn on/off the external memory power switch depending on operability of the external nal memory.

8 Claims, 3 Drawing Sheets

APPARATUS AND METHOD FOR CONTROLLING POWER OF EXTERNAL MEMORY IN MOBILE TERMINAL

CLAIM OF PRIORITY

This application claims the priority under 35 U.S.C. §119(a) to a Korean Patent Application filed in the Korean Intellectual Property Office on Apr. 19, 2012 and assigned Serial No. 10-2012-0041000, the entire disclosure of which is incorporated herein by reference.

BACKGROUND OF THE INVENTION

1. Field of the Invention

The present invention relates generally to an apparatus and method for controlling power of an external memory, and more particularly, to an external memory power control apparatus and method capable of controlling power of an external memory inserted into a mobile terminal.

2. Description of the Related Art

New-concept mobile terminals with many additional features have been developed to meet the needs of consumers in addition to a traditional call function. Also, due to a rapid growth of wireless open networks and an expansion of the dissemination of high-end mobile terminals, diverse and dynamic content supply chains have been realized.

Further, in response to the needs for large amounts of content, an insertable/extractable external memory is commonly used in the mobile terminals in addition to the internal memory.

However, when a bad external memory whose power terminal PW and ground terminal GND are short-circuited is inserted into a mobile terminal, the mobile terminal may fail to boot up or undergo heating due to the overcurrent occurring in the external memory.

A mobile terminal is typically set to supply power to its external memory when it is powered on and operates a boot operation. Therefore, if the mobile terminal is powered on with a malfunctioning external memory inserted thereinto, an overcurrent of about 1-1.2 A may occur in the bad external memory which in turn causes the mobile terminal to fail to boot up. Moreover, the mobile terminal may suffer from heating due to the overcurrent occurring in the external memory.

SUMMARY OF THE INVENTION

An aspect of an embodiment of the present invention is to provide an external memory power control apparatus and method capable of controlling power of an external memory inserted into a mobile terminal to avoid the drawbacks in the conventional art.

In accordance with one aspect of the present invention, an apparatus for controlling power of an external memory in a mobile terminal includes an external memory power switch for switching between a power supply and an external memory to supply or block power for the external memory; and a controller for checking and notifying operability of the external memory inserted into the mobile terminal after completing booting with the external memory power switch turned off, when 'power-on' is selected on the mobile terminal.

In accordance with another aspect of the present invention, an apparatus for controlling power of an external memory in a mobile terminal includes an external memory power switch for switching between a power supply and an external memory to supply or block power for the external memory; and a controller for turning on/off the external memory power switch depending on operability of the external memory, when the external memory is inserted with the mobile terminal powered on.

In accordance with further another aspect of the present invention, provided a method for controlling power of an external memory in a mobile terminal includes completing booting with an external memory power switch turned off, when 'power-on' is selected on the mobile terminal; and after completion of the booting, checking and notifying operability of the external memory inserted in the mobile terminal.

In accordance with another aspect of the present invention, a method for controlling power of an external memory in a mobile terminal includes determining operability of the external memory, if the external memory is inserted with the mobile terminal powered on; and turning on/off an external memory power switch depending on the operability of the external memory.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

Preferred embodiments of the present invention will now be described in detail with reference to the accompanying drawings. In the following description, specific details such as detailed configuration and components are merely provided to assist the overall understanding of exemplary embodiments of the present invention. Therefore, it should be apparent to those skilled in the art that various changes and modifications of the embodiments described herein can be made without departing from the scope and spirit of the invention. In addition, descriptions of well-known functions and constructions are omitted for clarity and conciseness.

Figure 1:
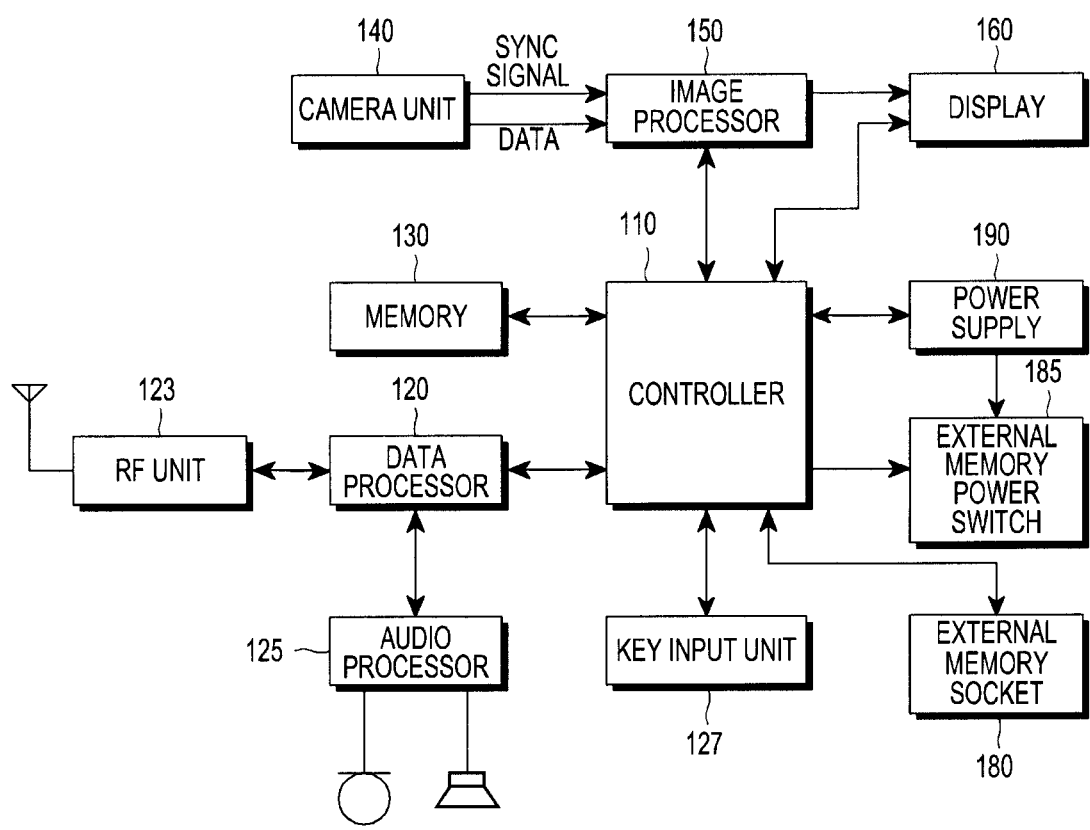
FIG. 1 shows a structure of a mobile terminal according to an embodiment of the present invention.

FIG. 1 shows a structure of a mobile terminal according to an embodiment of the present invention.

Referring to FIG. 1, a Radio Frequency (RF) unit 123 is responsible for wireless communication of the mobile terminal. The RF unit 123 includes an RF transmitter for up-converting a frequency of transmission signals and amplifying the up-converted transmission signals, and an RF receiver for low-noise-amplifying received signals and down-converting a frequency of the amplified received signals. A data processor 120 includes a transmitter for coding and modulating the transmission signals, and a receiver for demodulating and decoding the received signals. To this end, the data processor 120 may include a modulator/demodulator (modem) and a coder/decoder (codec). The codec includes a data codec for processing data signals such as packet data, and an audio codec for processing audio signals such as voice. An audio processor 125 plays received audio signals output from the audio codec of the data processor 120 using a speaker SPK, and transfers transmission audio signals detected by a microphone MIC to the audio codec of the data processor 120.

A key input unit 127 includes alphanumeric keys for inputting alphanumeric information and function keys for setting various functions.

A memory 130 may include a program memory and a data memory. The program memory may store programs for controlling the overall operation of the mobile terminal, and programs for checking operability of an external memory after booting the mobile terminal with the power supplied to the external memory blocked, and selectively supplying or blocking the power for the external memory depending on the operability of the external memory that is inserted with the mobile terminal powered on in accordance with an embodiment of the present invention. The data memory temporarily stores the data generated during execution of the programs.

A controller 110 controls the overall operation of the mobile terminal.

If an external memory is inserted, an external memory socket 180 notifies the controller 110 of the insertion of the external memory.

The external memory power switch 185, under control of the controller 110, switches between a power supply 190 and the external memory to supply or block the power for the external memory.

The power supply 190 supplies power to all components of the mobile terminal. Although it is assumed in embodiments of the present invention that the controller 110 supplies or blocks the power for the external memory by controlling switching of the external memory power switch 185 depending on the operability of the external memory, this operation by the controller 110 may be performed by the power supply 190 in the same way.

A camera unit 140 includes a camera sensor (not shown) for capturing image data and converting captured optical image signals into electrical image signals, and a signal processor (not shown) for converting analog image signals captured by the camera sensor into digital image data. The camera sensor is assumed to be a Charge-Coupled Device (CCD) or Complementary Metal-Oxide Semiconductor (CMOS) sensor, and the signal processor may be implemented with a Digital Signal Processor (DSP). The camera sensor and the signal processor may be implemented integrally or separately.

An image processor 150 performs Image Signal Processing (ISP) to display the image signals output from the camera unit 140 on a display 160. The ISP includes functions such as gamma correction, interpolation, spatial variation, image effecting, image scaling, Auto White Balance (AWB), Auto Exposure (AE), and Auto Focus (AF). The image processor 150 processes the image signals output from the camera unit 140 on a frame-by-frame basis, and outputs the frame image data according to the characteristics and size of the display 160. The image processor 150, which includes a video codec, compresses the frame image data displayed on the display 160 using a preset coding scheme, and decompresses the compressed frame image data into its original frame image data. The video codec may be a Joint Photographic Experts Group (JPEG) codec, a Moving Picture Experts Group 4 (MPEG4) codec, a Wavelet codec, etc. When supporting an On Screen Display (OSD) feature, the image processor 150 may output OSD data according to the size of the displayed screen under control of the controller 110.

The display 160 displays, on a screen, the image signals output from the image processor 150 and the user data output from the controller 110. The display 160 may be implemented with Liquid Crystal Display (LCD). In this case, the display 160 may include an LCD controller, a memory capable of storing image data, and an LCD panel. When supporting the touch screen feature, the LCD may serve as an input unit as well, and in this case, the display 160 may display the same keys as those on the key input unit 127.

Briefly, in accordance with a first embodiment of the present invention, when a mode for 'power-on' is selected in the mobile terminal, the controller 110 checks and notifies operability of the external memory inserted into the mobile terminal after completing its booting while an external memory power switch 185 tuned off.

When the external memory is inserted after the booting of the mobile terminal is completed, the controller 110 supplies power to the external memory by turning on the external memory power switch 185, checks operability of the external memory, and notifies a damage of the external memory when the external memory undergoes overcurrent or is inoperable.

When the external memory undergoes overcurrent or is inoperable, the controller 110 may block the power supplied to the external memory by turning off the external memory power switch 185.

When a mode for 'power-off' is selected in the mobile terminal, the controller 110 determines a state of the external memory power switch 185, and turns off the power of the mobile terminal after turning off the external memory power switch 185 if the external memory power switch 185 is turned on.

In accordance with a second embodiment of the present invention, when the external memory is inserted when the mobile terminal powered on, the controller 110 turns on/off the external memory power switch 185 depending on operability of the external memory.

When the external memory is inserted into the mobile terminal, the controller 110 checks a state of the external memory power switch 185, and may supply power to the external memory by turning on the external memory power switch 185 if the external memory power switch 185 is turned off.

The controller 110 checks operability of the external memory inserted in the mobile terminal, and blocks the power supplied to the external memory by turning off the external memory power switch 185 if the external memory undergoes overcurrent or is inoperable. Herein, the controller 110 can determine that the external memory is inoperable if any signals are not received from the external memory after supplying the power from the external memory.

When the external memory undergoes overcurrent or is inoperable, the controller 110 notifies a damage of the external memory.

Now, an operation of controlling power of an external memory in the mobile terminal according to the teachings of the present invention will be described with reference to FIGS. 2 and 3.

Figure 2:
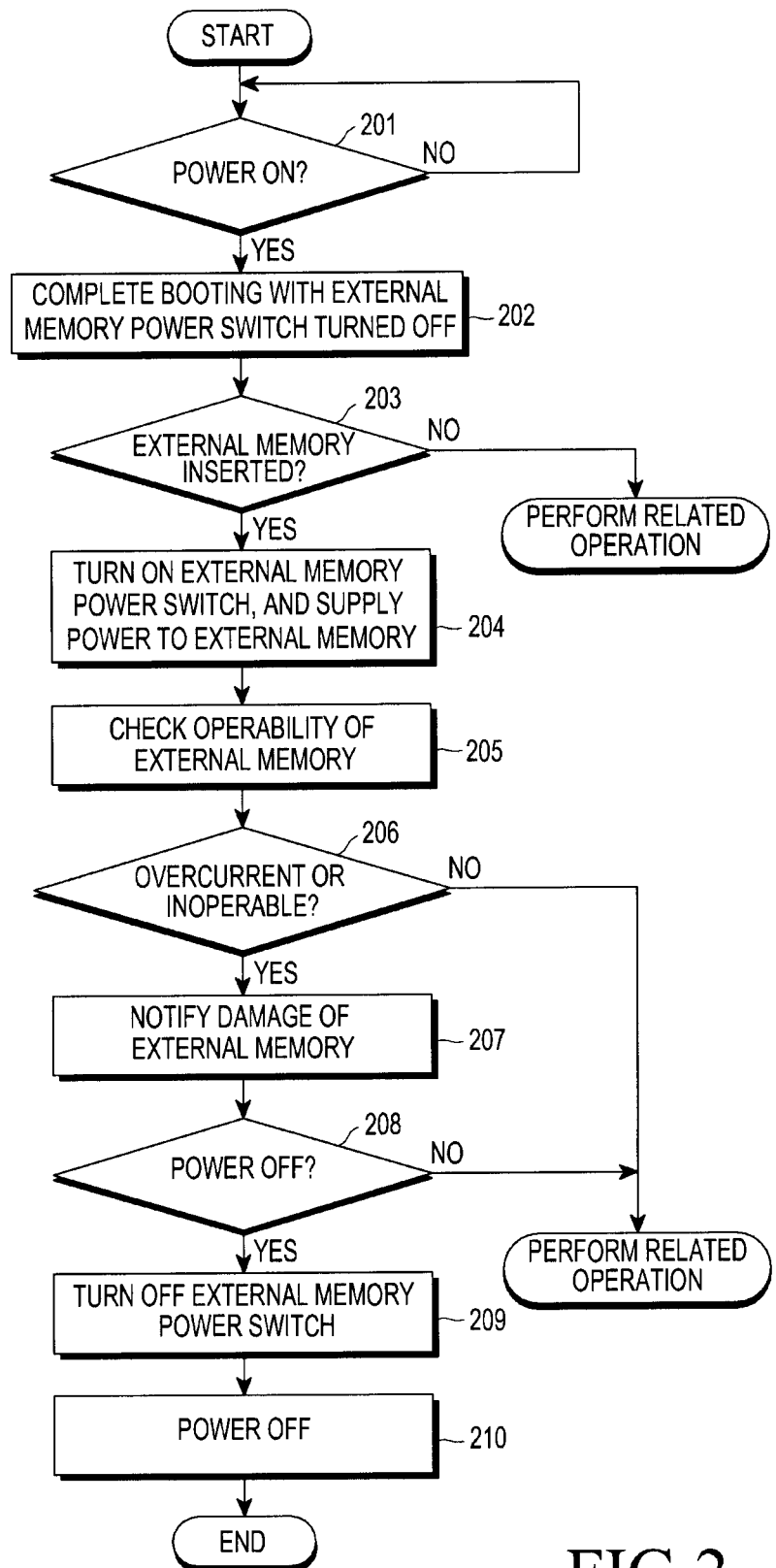
FIG. 2 shows a process of controlling power of an external memory in a mobile terminal according to a first embodiment of the present invention.

FIG. 2 shows a process of controlling power of an external memory in a mobile terminal according to a first embodiment of the present invention.

The first embodiment of the present invention will be described in detail with reference to FIGS. 1 and 2.

Referring to FIG. 2, the controller 110 determines in step 201 whether 'powered-on' is selected in the mobile terminal. If 'powered-on' is selected on the mobile terminal, the controller 110 boots the mobile terminal in step 202. At this point, no power is supplied to the external memory socket 180 into which the external memory is inserted because the external memory power switch 185 for supplying or blocking the power for the external memory is in an OFF state.

If the booting of the mobile terminal is completed while the external memory power switch 185 turned off, the controller 110 determines in step 203 whether the external memory is inserted into the external memory socket 180.

Upon detecting an insertion of the external memory in the external memory socket 180, the controller 110 turns on the external memory power switch 185 and supplies power to the external memory by means of the power supply 190 in step 204.

In step 205, the controller 110 checks operability of the external memory inserted into the external memory socket 180. In other words, the controller 110 checks whether the external memory is operable or not.

The controller 110 determines in step 206 whether the external memory undergoes overcurrent or is inoperable due to the short circuit between the power terminal PW and the ground terminal GND thereof. If the external memory undergoes overcurrent or is inoperable, the controller 110 notifies the user of a damage of the external memory in step 207. In step 207, the controller 110 may turn off the external memory power switch 185 as the inserted external memory undergoes overcurrent or is inoperable. In step 207, the controller 110 may inform the user of the damage of the external memory using a User Interface (UI).

The controller 110 determines in step 208 whether 'power-off' is selected on the mobile terminal. If 'power-off' is selected on the mobile terminal, the controller 110 checks a state of the external memory power switch 185. If the external memory power switch 185 is in an ON state, the controller 110 turns off the external memory power switch 185 in step 209, and turns off the power of the mobile terminal in step 210.

As described above, the mobile terminal is powered on and booted with the external memory power switch provided between the external memory and the power supply being turned off, and thereafter operability of the external memory is checked after the booting is completed. As a result, the inventive process makes it possible to solve the problem that the mobile terminal may fail to boot up due to the insertion of a short-circuited external memory.

Figure 3:
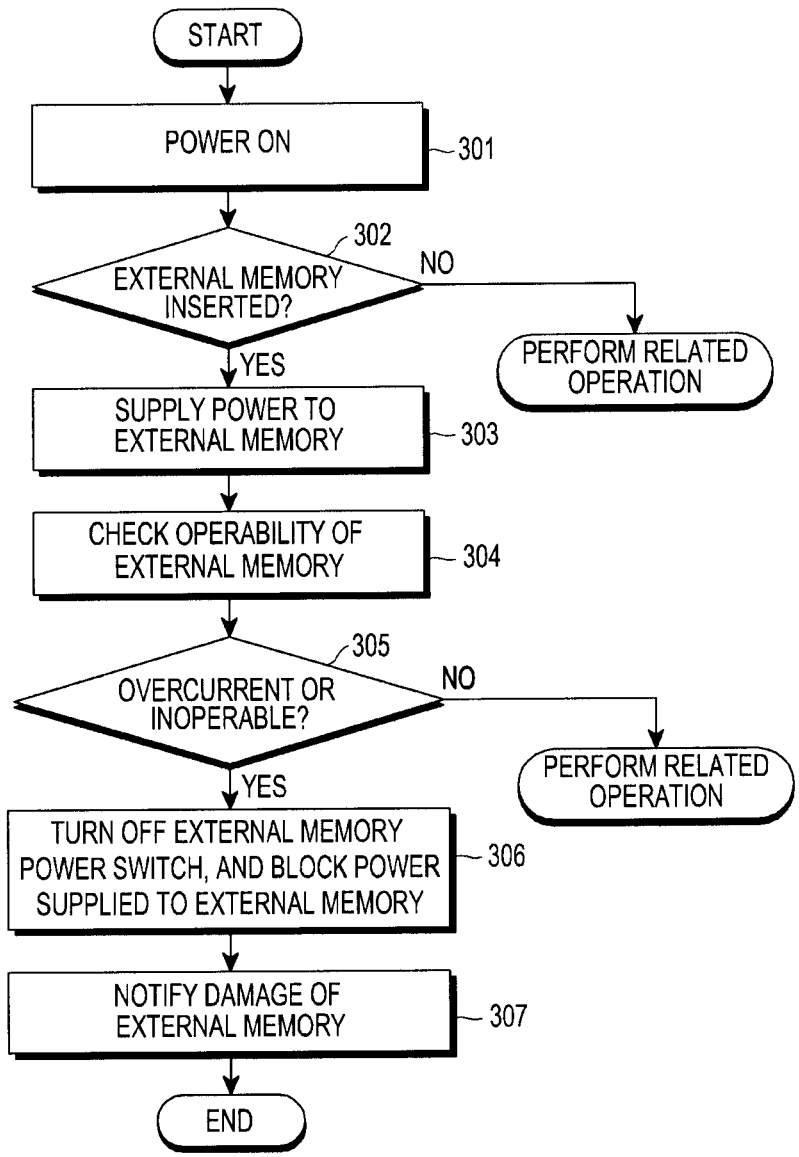
FIG. 3 shows a process of controlling power of an external memory in a mobile terminal according to a second embodiment of the present invention.

FIG. 3 shows a process of controlling power of an external memory in a mobile terminal according to a second embodiment of the present invention.

The second embodiment of the present invention will be described in detail with reference to FIGS. 1 and 3.

Referring to FIG. 3, after the mobile terminal is powered on in step 301, the controller 110 determines in step 302 whether the external memory is inserted into the external memory socket 180. Upon receiving an insertion signal from a detector indicating the insertion of the external memory from the external memory socket 180 in step 302, the controller 110 checks a state of the external memory power switch 185. If the external memory power switch 185 is in an OFF state, the controller 110 supplies power output from the power supply 190 to the external memory by turning on the external memory power switch 185 in step 303.

In step 304, the controller 110 checks operability of the external memory inserted into the external memory socket 180.

The controller 110 determines in step 305 whether the external memory undergoes overcurrent or is inoperable due to the short circuit between the power terminal PW and the ground terminal GND thereof. If the external memory undergoes overcurrent or is inoperable, the controller 110 blocks the power supplied to the external memory by turning off the external memory power switch 185 in step 306.

In step 307, while blocking the power supplied to the external memory, the controller 110 informs the user of the damage of the external memory. In step 307, the controller 110 may inform the user of the damage of the external memory using a User Interface (UI).

As described above, the external memory power switch is provided between the external memory and the power supply, and the power supplied to the external memory is blocked when the external memory inserted into the mobile terminal undergoes overcurrent or is inoperable, thereby making it possible to prevent the mobile terminal from suffering from heating which may be caused by the insertion of the short-circuited external memory.

As is apparent from the foregoing description, the proposed external memory power control apparatus and method may prevent the mobile terminal from failing to boot up or suffering from heating due to the overcurrent which may occur when a short-circuited bad external memory is inserted into the mobile terminal.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for controlling power of an external memory in a mobile terminal, comprising:
    a power switch for selectively supplying power to the external memory; and
    a controller for determining operability of the external memory inserted into the mobile terminal after booting responsive to a power-on of the mobile terminal while the power switch turned off and selectively supplying power to the external memory based on the detection outcome,
    wherein the controller further determines a state of the external memory power switch during a power-off of the mobile terminal, and if the power switch is on, the controller turns off the power of the mobile terminal after turning off the power switch.

2. The apparatus of claim 1, wherein the controller supplies power to the external memory by turning on the power switch when the external memory is inserted into the mobile terminal.

3. The apparatus of claim 2, wherein the controller blocks the power supplied to the external memory by turning off the power switch, when the external memory is determined to be inoperable or overcurrent is detected therefrom.

4. The apparatus of claim 1, wherein the controller further notifies a damage of the external memory when the external memory is determined to be inoperable or overcurrent is detected therefrom.

5. A method for controlling power of an external memory in a mobile terminal, comprising:
    in response to a power-on of the mobile terminal, booting the mobile terminal while an external memory power switch is turned off;
    after completion of the booting, detecting operability of external memory inserted in the mobile terminal;
    determining a state of the power switch when the mobile terminal is powered-off; and
    if the external memory power switch is turned on, turning off power of the mobile terminal after turning off the power switch.

6. The method of claim 5, further notifying operability of the external memory based on the detection outcome.

7. The method of claim 6, wherein the notifying step comprises:
    after completion of the booting, checking whether the external memory is inserted;
    supplying power to the external memory by turning on the power switch when the external memory is inserted;
    determining operability of the external memory after power is supplied thereto; and
    notifying a damage of the external memory if the external memory is determined to be inoperable or overcurrent is detected therefrom.

8. The method of claim 7, further comprising blocking the power supplied to the external memory by turning off the power switch when the external memory is determined to be inoperable or overcurrent is detected therefrom.

* * * * *